US009568599B2

(12) United States Patent
Nakahama et al.

(10) Patent No.: US 9,568,599 B2
(45) Date of Patent: Feb. 14, 2017

(54) RADAR SIGNAL PROCESSING DEVICE, RADAR APPARATUS, AND METHOD OF PROCESSING RADAR SIGNAL

(71) Applicant: Furuno Electric Co., Ltd., Nishinomiya (JP)

(72) Inventors: Masahiro Nakahama, Nishinomiya (JP); Yasuo Itoh, Nishimoniya (JP)

(73) Assignee: Furuno Electric Co. Ltd., Nishinomiya (JP)

( * ) Notice: Subject to any disclaimer, the term of this patent is extended or adjusted under 35 U.S.C. 154(b) by 357 days.

(21) Appl. No.: 14/377,836

(22) PCT Filed: Feb. 5, 2013

(86) PCT No.: PCT/JP2013/052623
§ 371 (c)(1),
(2) Date: Aug. 8, 2014

(87) PCT Pub. No.: WO2013/118730
PCT Pub. Date: Aug. 15, 2013

(65) Prior Publication Data
US 2015/0054672 A1    Feb. 26, 2015

(30) Foreign Application Priority Data
Feb. 8, 2012 (JP) ................. 2012-025462

(51) Int. Cl.
*G01S 13/93* (2006.01)
*G01S 13/04* (2006.01)
(Continued)

(52) U.S. Cl.
CPC ................. *G01S 13/04* (2013.01); *G01S 7/02* (2013.01); *G01S 7/04* (2013.01); *G01S 7/298* (2013.01);
(Continued)

(58) Field of Classification Search
CPC ............. G01S 13/04; G01S 7/02; G01S 7/04; G01S 7/298; G01S 7/2923; G01S 13/9307
(Continued)

(56) References Cited

U.S. PATENT DOCUMENTS

2002/0145555 A1* 10/2002 Klausing ................. G01S 7/411
342/25 R
2006/0082493 A1    4/2006 Fujikawa et al.
(Continued)

FOREIGN PATENT DOCUMENTS

JP        06347542 A  * 12/1994
JP         843519 A     2/1996
(Continued)

OTHER PUBLICATIONS

S. R. Rogers, "Tracking multiple targets with correlated measurements and maneuvers," in IEEE Transactions on Aerospace and Electronic Systems, vol. 24, No. 3, pp. 313-315, May 1988.*
(Continued)

*Primary Examiner* — John B Sotomayor
(74) *Attorney, Agent, or Firm* — Alleman Hall McCoy Russell & Tuttle LLP

(57) ABSTRACT

A radar signal processing device is provided, which performs a scan correlation in a polar coordinate system to secure accuracy of the scan correlation, and prevents a suppression of a target object moving at high speed due to the scan correlation. A polar coordinate correlator performs, in a polar coordinate system, a correlation between reception data and previous correlated data stored in a previous data storage. A trend curve calculating module calculates a trend curve of a distance-direction signal level of the reception data in the polar coordinate system. A target detecting module detects a target based on the signal level of the reception data and the trend curve. Further, the polar coor-
(Continued)

dinate correlator changes the contents of the correlation of the reception data based on the target detection result from the target detecting module.

15 Claims, 6 Drawing Sheets

(51) Int. Cl.
    *G01S 7/292* (2006.01)
    *G01S 7/298* (2006.01)
    *G01S 7/02* (2006.01)
    *G01S 7/04* (2006.01)

(52) U.S. Cl.
    CPC .......... *G01S 7/2923* (2013.01); *G01S 13/9307* (2013.01)

(58) Field of Classification Search
    USPC .................... 342/27, 41, 159, 185, 189, 195
    See application file for complete search history.

(56) References Cited

U.S. PATENT DOCUMENTS

| | | | | |
|---|---|---|---|---|
| 2006/0145914 A1* | 7/2006 | Fujikawa | .......... | G01S 7/064 342/185 |
| 2007/0018888 A1* | 1/2007 | Fujikawa | .......... | G01S 7/04 342/185 |
| 2010/0033367 A1* | 2/2010 | Hellsten | .......... | G01S 13/9035 342/25 A |
| 2011/0205104 A1* | 8/2011 | Nakagawa | .......... | G01S 7/22 342/145 |
| 2012/0001793 A1* | 1/2012 | Jacobs | .......... | G01S 7/4004 342/146 |
| 2012/0218138 A1* | 8/2012 | Reiter | .......... | G01S 7/003 342/91 |
| 2013/0151135 A1* | 6/2013 | Aubrey | .......... | G08G 1/00 701/118 |

FOREIGN PATENT DOCUMENTS

| | | |
|---|---|---|
| JP | 8262128 A | 10/1996 |
| JP | 1194931 A | 4/1999 |
| JP | 2002139562 A | 5/2002 |
| JP | 200375528 A | 3/2003 |
| JP | 2006112973 A | 4/2006 |
| JP | 2009058433 A | 3/2009 |
| JP | 20112426 A | 1/2011 |
| JP | 201195029 A | 5/2011 |
| JP | 2011095215 A | 5/2011 |
| JP | 2011242253 A | 12/2011 |

OTHER PUBLICATIONS

Japanese Patent Office, International Search Report of PCT/JP2013/052623, WIPO, May 7, 2013, 4 pages.

* cited by examiner

CONVENTIONAL EXAMPLE

SCAN CORRELATION RESULT

PRESENT INVENTION

SCAN CORRELATION RESULT

RADAR SIGNAL PROCESSING DEVICE, RADAR APPARATUS, AND METHOD OF PROCESSING RADAR SIGNAL

CROSS REFERENCE TO RELATED APPLICATIONS

The present application is a U.S. National Phase of International Patent Application Serial No. PCT/JP2013/052623, entitled "Radar-Signal Processing Device, Radar Device, and Radar-Signal Processing Method," filed on Feb. 5, 2013, which claims priority to Japanese Patent Application No. 2012-025462, filed on Feb. 8, 2012.

TECHNICAL FIELD

The present invention mainly relates to a radar signal processing device, which suppresses clutter by performing a scan correlation on a reception signal.

BACKGROUND ART

Ship radars transmit radio waves from an antenna which rotates at a predetermined cycle on a horizontal plane, and receives reflection signals from targets in the surroundings from the antenna. Each received signal (reception signal) is converted into reception data by an A/D converter. The reception data is suitably processed and then is displayed on a display unit as a radar image. An operator of the radar can find out the situation regarding the targets in the surroundings by checking the displayed radar image.

A distance r to a target can be obtained based on a time length required for the antenna to receive the reflection signal from the target from its transmission. Moreover, the direction of the target can be obtained based on an orientation θ of the antenna when it received the reflection signal from the target. In other words, it can be said that the signal received by the ship radar indicates a position of the target in a polar coordinate system (r, θ).

There are cases where the reception signal contains clutter (a reflection wave from the sea surface or rain) and noise. If clutter and noise are displayed on the radar image, discriminability of the target on the radar image decreases. Thus, conventionally, in ship radars, a scan correlation for discriminating the target from clutter based on stability of the reception signals between scans and reflecting it on the radar image has been known. Patent Documents 1 to 4 disclose such kind of scan correlation, for example.

Patent Document 1 discloses a configuration in which the coordinates of the reception data indicated in the polar coordinate system are converted into an orthogonal coordinate system and the scan correlation is performed by accessing an image memory by write-and-read addresses corresponding to the coordinates in the orthogonal coordinate system. In other words, in Patent Document 1, the scan correlation is performed by converting the reception data from the polar coordinate system into the orthogonal coordinate system.

In this regard, Patent Documents 2 and 3 point out problems in performing the scan correlation after the conversion of coordinates into the orthogonal coordinate system. For example, Patent Document 2 points out, in the scan correlation in which the conversion from the polar coordinate system into the orthogonal coordinate system is performed, a problem that reception data (echo data) needs to be selected and interpolation data needs to be created in the coordinate conversion, and the original echo data cannot be used in the scan correlation as it is. Moreover, Patent Document 3 points out a problem that the accuracy of the correlation easily degrades since the corresponding relationship between the reception data and the sweep will be lost when the reception data is written in the image memory (memory for correlation) by an address in the orthogonal coordinate system.

Thus, Patent Documents 2 and 3 disclose configurations in which the scan correlation is performed with the polar coordinate system remained. Patent Document 2 claims that a resolution can be improved by performing the scan correlation by using the coordinate system when the signal is received. Moreover, Patent Document 3 claims that the accuracy of the scan correlation does not degrade by keeping the corresponding relationship between a true transmitting direction and a relative transmitting direction of the signal when writing/reading it into the image memory.

REFERENCE DOCUMENTS OF CONVENTIONAL ART

Patent Document(s)

Patent Document 1: JP1996-043519A
Patent Document 2: JP2011-095029A
Patent Document 3: JP2003-075528A
Patent Document 4: JP1999-094931A

DISCLOSURE OF THE INVENTION

Problems to be Solved by the Invention

Meanwhile, performing the scan correlation described above causes a problem of a suppression of the signal of the target relatively moving at high speed. In other words, since the target relatively moving at high speed does not exist stably at one point on a radar display screen, the target cannot be discriminated from clutter and noise in this case. Therefore, if the scan correlation is performed, the signal of the target relatively moving at high speed is suppressed, causing a phenomenon in which the image of the target on the radar image becomes unclear (moreover, the target is not displayed at all) occurs as a result.

In this regard, for example, Patent Document 4 discloses processing of estimating the position of the target (target object) by capturing and tracking the target, and correcting the position of the target to the estimated position. Patent Document 4 claims, accordingly, that the target to be observed can clearly be displayed even if it moves at high speed. However, since such processing of correcting the relative movement of the target is not easy to perform with the coordinates in the polar coordinate system, the processing is performed after the coordinates are converted into the orthogonal coordinate system. Therefore, when the processing in Patent Document 4 is performed, the degradation of the accuracy of the scan correlation due to the coordinate conversion from the polar coordinate system into the orthogonal coordinate system cannot be avoided. Moreover, the capturing-and-tracking processing requires a high processing load and there is a limit in the number of targets that can be captured and tracked at a time.

The present invention is made in view of the above situations and it mainly aims to provide a radar signal processing device, which keeps accuracy of a scan correlation by performing the scan correlation in a polar coordinate system, and also prevents a target object moving at high speed from being suppressed by the scan correlation.

SUMMARY OF THE INVENTION

Problems to be solved by the present invention are described above, and means for solving the problems and effects thereof will be described below.

According to a first aspect of the present invention, a radar signal processing device having the following configuration is provided. That is, the radar signal processing device includes a signal acquirer, a previous data storage, a polar coordinate correlator, a trend curve calculating module, and a target detecting module. The signal acquirer acquires reception data in a polar coordinate system based on a reception signal. The previous data storage stores previous correlated data in the polar coordinate system. The polar coordinate correlator generates correlated data by performing, in the polar coordinate system, a correlation between the reception data and the previous correlated data stored in the previous data storage. The trend curve calculating module calculates a trend curve of a distance-direction signal level of the reception data in the polar coordinate system. The target detecting module detects a target based on the signal level of the reception data and the trend curve. Further, the polar coordinate correlator changes the contents of the correlation of the reception data, based on the target detection result from the target detecting module.

By changing the contents of the scan correlation according to whether the target is detected by the target detecting module as above, a suppression of the target due to the scan correlation can be prevented.

The radar signal processing device is preferably configured as follows. That is, when the signal level of the reception data is higher than the trend curve by a predetermined level, the target detecting module detects the target. When the target detecting module detects the target, the polar coordinate correlator outputs a value of the reception data without being correlated.

By comparing the trend curve with the signal level of the reception data as above, the target can be detected easily. Further, when the target is detected, by outputting the reception data which is not scan-correlated, the suppression of the signal level of the reception data indicating the target due to the scan correlation can be prevented.

The radar signal processing device is preferably configured as follows. That is, when the signal level of the reception data is higher than the trend curve by a predetermined level, the target detecting module detects the target. The polar coordinate correlator changes weight coefficients of the reception data and the previous correlated data for the case where the target is detected by the target detecting module and the case where the target is not detected.

By changing the weight coefficients as above, the effect of the scan correlation can be changed. Thus, the suppression of the target due to the scan correlation can be prevented.

The radar signal processing device is preferably configured as follows. That is, the target detecting module outputs a gate signal indicating whether the target is detected. The polar coordinate correlator changes the contents of the correlation according to the gate signal.

Thus, the processing can be switched according to whether the target exists, with the simple configuration.

The radar signal processing device is preferably configured as follows. That is, the radar signal processing device includes a detection result storage configured to store at least the detection result from the target detecting module in a scan immediately previous to a current scan. The polar coordinate correlator uses at least one of the detection result from the immediately previous scan stored in the detection result storage and the detection result from the current scan outputted from the target detecting module.

By referring to the previous target detection result as above, the existence of the target can be determined more accurately.

The radar signal processing device is preferably configured as follows. That is, the target detecting module detects the target when the signal level of the reception data is higher than a curve that is the trend curve with an offset added thereto.

By adding the offset to the trend curve as above, a false detection of an unnecessary signal as the target can be prevented.

The radar signal processing device is preferably configured as follows. That is, the signal acquirer has a log amplifier and a linear amplifier. The signal acquirer outputs an output of the log amplifier to the trend curve calculating module and the target detecting module. Moreover, the signal acquirer outputs an output of the linear amplifier to the polar coordinate correlator.

That is, by performing the processing of detecting the target by using the output of the log amplifier which has the wide dynamic range and does not saturate easily, the target can be detected accurately. Meanwhile, by performing the scan correlation using the output of the linear amplifier obtained by linearly amplifying the reception signal, the correlation between the previous signal level and the current signal level can be easily taken. As a result, a suitable scan correlation result can be obtained.

According to a second aspect of the present invention, a radar apparatus is provided, which includes the radar signal processing device described above, a radar antenna configured to receive the reception signal, and a display unit configured to display a radar image based on the result of the scan correlation performed by the polar coordinate correlator.

This radar apparatus can display the radar image where the target moving at high speed is not suppressed, and thus, an operator of this radar apparatus can accurately grasp the situation of the target in the surroundings of the apparatus.

According to a third aspect of the present invention, a method of processing a radar signal is provided. That is, the method of processing the radar signal includes acquiring reception data in a polar coordinate system based on a reception signal, acquiring previous correlated data in the polar coordinate system, generating correlated data by performing, in the polar coordinate system, a correlation between the reception data and the previous correlated data, calculating a trend curve of a distance-direction signal level of the reception data in the polar coordinate system, and detecting a target based on the signal level of the reception data and the trend curve. Further, in the generating the correlated data, the contents of the correlation of the reception data is changed based on the target detection result from the detecting the target.

MODE(S) FOR CARRYING OUT THE INVENTION

Figure 1:
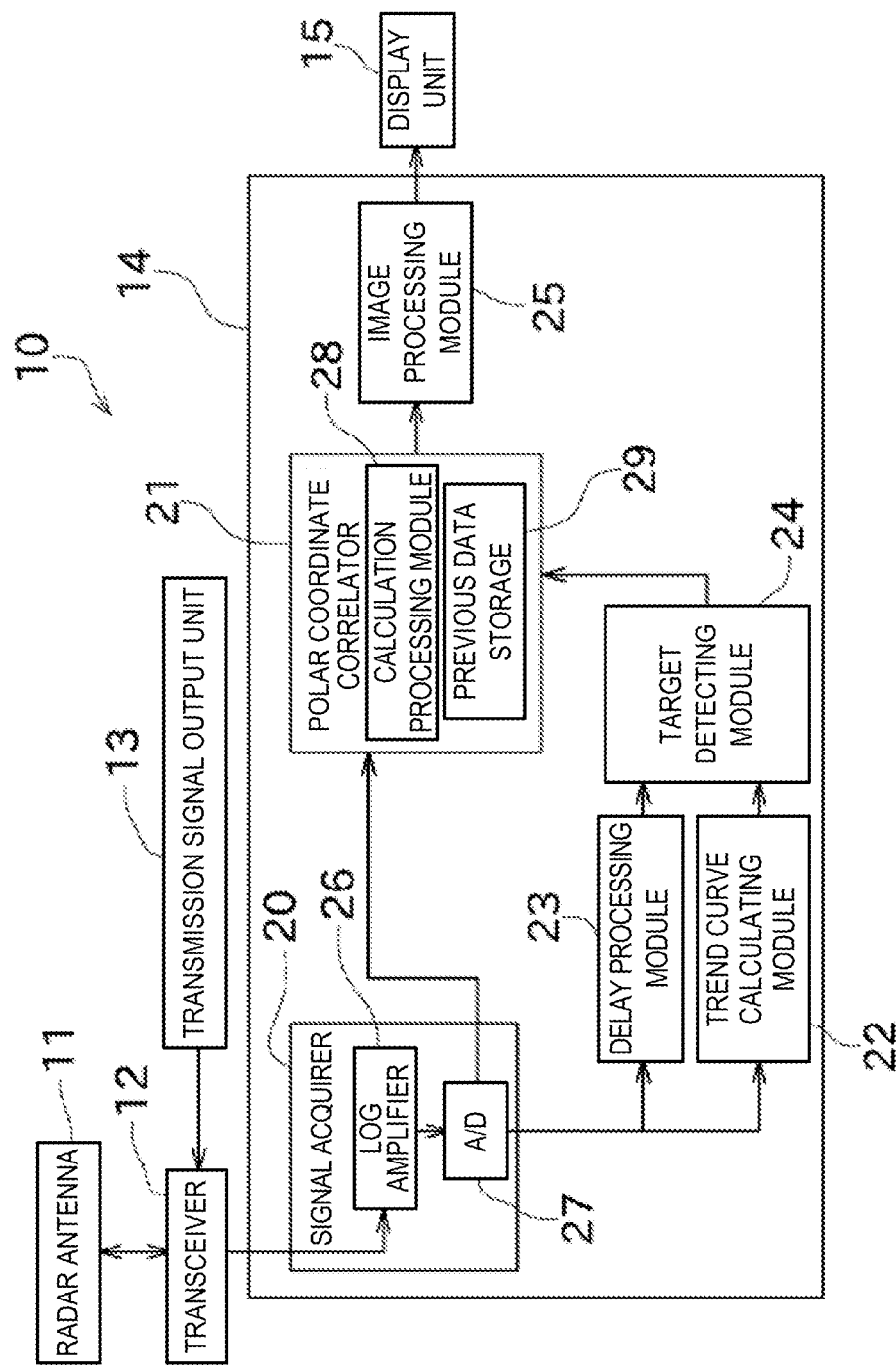
FIG. 1 is a block diagram of a radar apparatus according to one embodiment of the present invention.

Next, embodiments of the present invention are described with reference to the drawings. As illustrated in FIG. 1, a radar apparatus 10 according to a first embodiment of the present invention is a radar apparatus for a ship, and displays situations of target(s) (e.g., other ship(s) and land(s)) in the surroundings of the ship. This radar apparatus 10 includes a radar antenna 11, a transceiver 12, a transmission signal output unit 13, a radar signal processing device 14, and a display unit 15.

The radar antenna 11 is an antenna having a directivity, and rotates 360 degrees on a plane at a predetermined cycle. In the description below, a direction to which a main lobe of the radar antenna 11 is oriented is simply referred to as an orientation of the radar antenna 11. The transmission signal output unit 13 outputs a pulse signal for a plurality of times while the radar antenna 11 performs one full rotation. The pulse signal is applied to the radar antenna 11 via the transceiver 12, and is discharged from the radar antenna 11.

The pulse signal discharged from the radar antenna 11 reflects on the target in the surroundings and is again received by the radar antenna 11. Here, the signal received by the radar antenna 11 is referred to as the "reception signal" in the description below. The reception signal received by the radar antenna 11 is inputted to the radar signal processing device 14 via the transceiver 12. An operation that the radar antenna 11 performs one full rotation while transceiving the signals is referred to as the "scan", and an operation of transmitting the pulse signal and then receiving the reception signal(s) before transmitting the next pulse signal is referred to as the "sweep." Note that, the detailed description of the configurations of the radar antenna 11, the transmission signal output unit 13, and the transceiver 12 is omitted since they are known.

The radar signal processing device 14 includes a signal acquirer 20, a polar coordinate correlator 21, a trend curve calculating module 22, a delay processing module 23, a target detecting module 24, and an image processing module 25.

The signal acquirer 20 receives the reception signal from the transceiver 12. The signal acquirer 20 includes a log amplifier 26 for amplifying the reception signal, and an A/D converter (analog-to-digital converter) 27 for sampling the reception signal amplified by the log amplifier 26 and converting it into digital data. The digital data outputted from the A/D converter 27 is referred to as reception data. The value of each reception data indicates a signal level of the reception signal when the reception data is sampled. Note that, the signal level of the reception signal received by the radar antenna 11 is within an extremely wide range from a high signal level (e.g., corresponding to the reflection signal from near the radar antenna 11) to a low signal level (e.g., corresponding to the reflection signal from a distance).

Thus, by using the log amplifier 26 to amplify the reception signal as described above, a saturation of the output is prevented when the signal level is high, and the sampling can be performed by the A/D converter 27 at a wide dynamic range.

When the reflection signal from the target is not received by the radar antenna 11, the signal level of the reception becomes a noise level, the value of the reception data acquired in this case becomes low. When the reflection signal from the target is received, the signal level of the reception signal becomes larger than the noise level, and the value of the reception data acquired in this case also becomes high. A distance r from the radar antenna 11 to the target can be obtained based on a time length required from the transmission of a pulse signal by the radar antenna 11 to the reception of the reflection signal thereof. Moreover, the direction of the target can be obtained based on the orientation θ of the radar antenna 11 when receiving the reflection signal. As described above, the reception data acquired by the signal acquirer 20 can be associated with a point on a plane by coordinates (r, θ) in a polar coordinate system. Therefore, it can be said that the signal acquirer 20 of the radar signal processing device 14 acquires each reception data in the polar coordinate system (r, θ).

The polar coordinate correlator 21 performs a scan correlation in the polar coordinate system. Specifically, the polar coordinate correlator 21 includes a calculation processing module 28 and a previous data storage 29. The previous data storage 29 is a memory region where correlated data for one previous scan (one full rotation of the radar antenna 11) can be saved.

The calculation processing module 28 performs the scan correlation in which latest reception data inputted from the signal acquirer 20 and correlated data from an immediately previous scan stored in the previous data storage 29 are weighted and combined to create new correlated data and output it. Specifically, a calculation performed by the calculation processing module 28 can be expressed by the following equation.

$$S'_{r,\theta} = (1-\alpha)D_{r,\theta} + \alpha S_{r,\theta} \tag{1}$$

Note that, $D_{r,\theta}$ is the value of the latest reception data (signal level) inputted from the signal acquirer 20, and the subscripts r and θ indicate that the reception data corresponds to a location (r, θ) in the polar coordinate system. $S_{r,\theta}$ indicates data corresponding to the position of the reception data $D_{r,\theta}$ (correlated data from the immediately previous scan) among the correlated data for one scan stored in the previous data storage 29. The coefficient α is a weight coefficient (filter coefficient) used in the weight combining and takes a value within a range between 0 and 1.

As it can be understood from Equation 1, the scan correlation is a kind of IIR filtering and acts to suppress unstable signals between scans. On the other hand, stable signals between the scans (reflection signals from a steady target) remain without being suppressed by the IIR filtering.

The previous data storage 29 stores the correlated data for one scan in the polar coordinate system. Specifically, a write-and-read address of the correlated data $S_{r,\theta}$ in the memory of the previous data storage 29 corresponds to the coordinates (r, θ) in the polar coordinate system associated with the correlated data $S_{r,\theta}$ on a one-on-one basis. Therefore, when performing the calculation of Equation 1, the correlated data $S_{r,\theta}$ can be read from the previous data storage 20 while it remains in the polar coordinate system, and the coordinate conversion is not necessary. Therefore, a processing result with higher accuracy compared to the configuration of performing the scan correlation after the coordinates are converted into the orthogonal coordinate system can be obtained, and the target is easily discriminated from clutter.

The polar coordinate correlator 21 outputs the result of the scan correlation to the image processing module 25. The image processing module 25 generates a two-dimensional image (radar image) showing the situation of the target(s) in the surroundings of the radar signal processing device based on the result of the scan correlation inputted from the polar coordinate correlator 21. Since clutter and noise are suppressed by the scan correlation, the image processing module 25 can generate the radar image with suppressed clutter and noise. The image processing module 25 outputs the radar image to the display unit 15. The display unit 15 displays the radar image. Thus, an operator of the radar apparatus 10 can find out the situation of the target object(s) in the surroundings.

Next, problems of the scan correlation are briefly described.

Figure 2A:
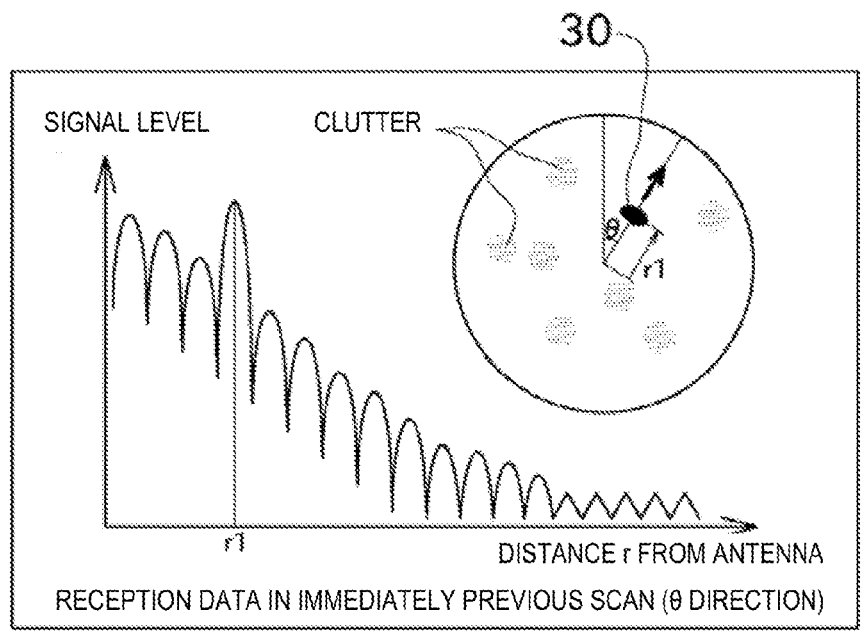
FIGS. 2(a) and 2(b) show views for describing a target relatively moving at high speed.
Figure 2B:
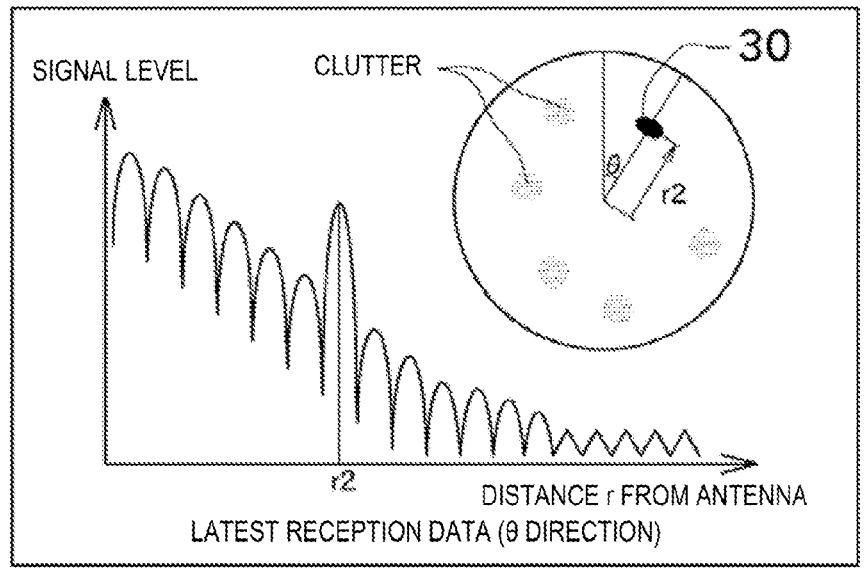

The scan correlation described above has a disadvantage of suppressing the signal level of the reception data indicating the target moving at high speed in relation to the radar antenna 11. For example, a case where a target 30 is moving at high speed in relation to the ship as illustrated in FIGS. 2(*a*) and 2(*b*) are considered. The chart in part (a) of FIG. 2 schematically indicates the reception data in the distance direction in an immediately previous scan, and the chart in part (b) of FIG. 2 schematically indicates the reception data in the distance direction acquired in the latest sweep. Moreover, a virtual radar image based on the reception data is shown in the upper rightward part of each chart.

Figure 3A:
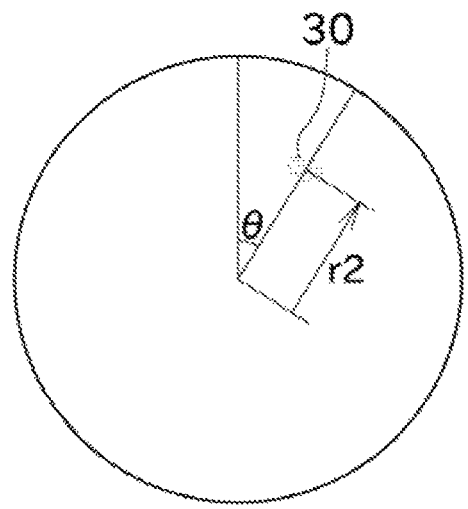
FIGS. 3(a) and 3(b) show views in which part (a) is a schematic view illustrating a radar image in which the target moving at high speed is suppressed by a conventional scan correlation, and part (b) is a schematic view illustrating a radar image based on an output of a radar signal processing device of the present invention.
Figure 3B:
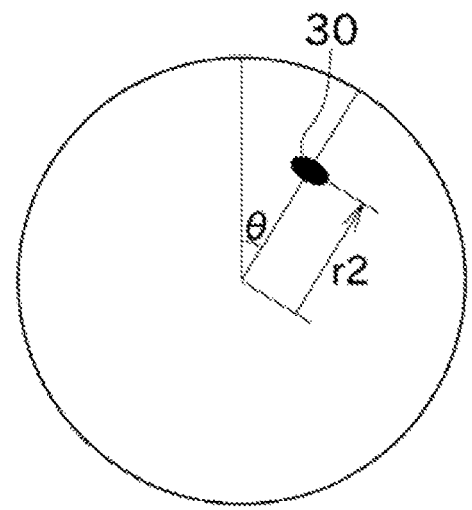

In the example of FIGS. 2(*a*) and 2(*b*), the target 30 exists at a location at a distance r1 in the immediately previous scan. On the other hand, in the latest reception data, the target 30 has moved to a location of a distance r2. As described, the position of the target 30 relatively moving at high speed changes between scans, and therefore, the correlation between the target 30 in the immediately previous scan and the target 30 in the latest scan cannot be taken. Therefore, if the scan correlation is performed, the target 30 moving at high speed is suppressed, and as a result, for example as illustrated in part (a) of FIG. 3, the target 30 which originally should be displayed at the position at the distance r2 is not displayed clearly on the radar image (or not displayed at all). As described, with the conventional scan correlation, there has been a problem of poor discriminability on the radar image of the target moving at high speed.

Meanwhile, the reflection signal from the target may have a sufficient level difference compared to clutter and noises. In such a case, the target can be discriminated from clutter and noise easily without performing the scan correlation.

Therefore, the radar signal processing device 14 of this embodiment detects the target by comparing the signal level of the reception data with a trend curve, and changes the contents of the scan correlation performed by the polar coordinate correlator 21 based on the target detection result.

Hereinafter, a characteristic configuration of the radar signal processing device 14 of this embodiment is described in detail. Specifically, the radar signal processing device 14 of this embodiment incudes the trend curve calculating module 22 and the target detecting module 24.

The trend curve calculating module 22 receives the reception data from the signal acquirer 20. The trend curve calculating module 22 calculates a trend curve of the value (signal level) of the reception data in the distance direction. In this embodiment, as the trend curve, the trend curve calculating module 22 obtains a moving average line of the value of the reception data in the distance direction. The trend curve calculating module 22 outputs the obtained trend curve to the target detecting module 24.

Figure 4:
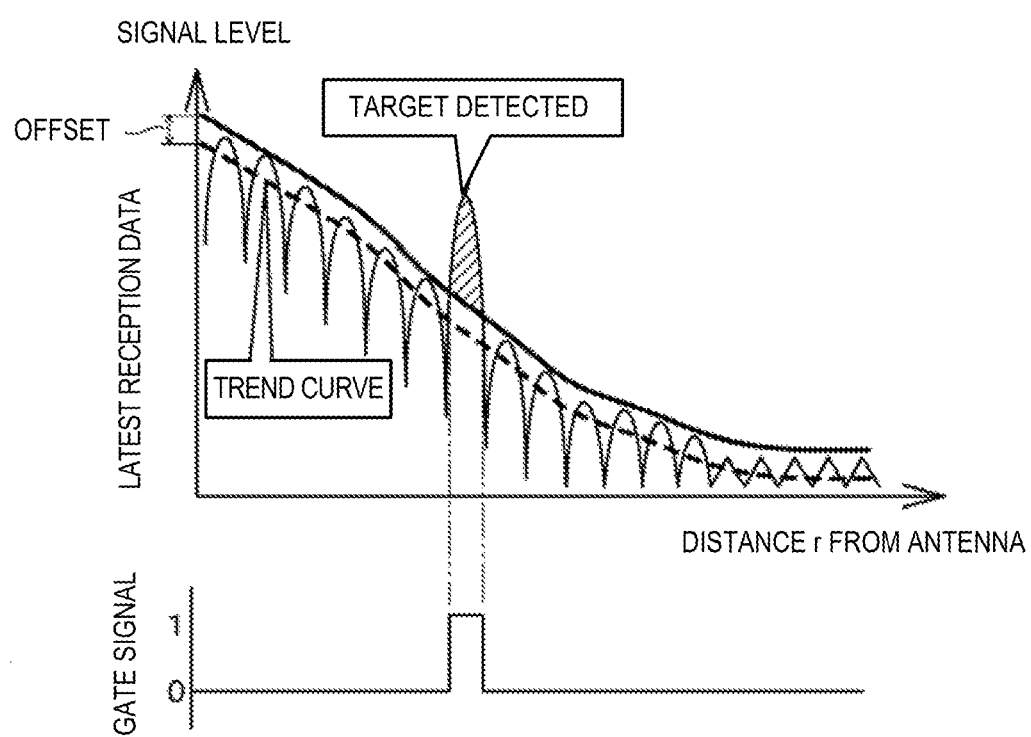
FIG. 4 shows charts for describing a detection of the target by a target detecting module.

The target detecting module 24 detects the target based on the reception data and the trend curve. Specifically, the target detecting module 24 compares the signal level of the reception data with a curve that is the trend curve with a constant offset added thereto (offset curve), and when the signal level of the reception data exceeds the offset curve, it detects the target. As illustrated in FIG. 4, by giving the offset value to the trend curve, noise and clutter do not exceed the offset curve easily, and a false detection of noise and clutter as the target can be prevented. Note that, since the trend curve is a moving average, it is delayed by a fixed time length from the latest reception data outputted from the signal acquirer 20. Thus, to perform the comparison by the target detecting module 24 suitably, the delay processing module 23 is provided, for delaying the reception data from the signal acquirer 20 by a time length corresponding to the delay time length of the trend curve, and outputting it to the target detecting module 24.

Note that, as described above, since the reception data outputted from the signal acquirer 20 is data amplified by the log amplifier 26 and sampled, even if it is a reception signal with a high level (e.g., the reflection signal from a close distance), the signal level thereof does not easily saturate and the dynamic range is wide. Therefore, the target detecting module 24 can accurately compare the signal level of the reception data with the trend curve, and can detect the target accurately.

Moreover, the target detecting module 24 outputs a gate signal indicating whether the target is detected (whether the signal level of the reception data exceeds the offset curve). For example, the target detecting module 24 of this embodiment outputs "0" when the target is not detected and outputs "1" when the target is detected. The gate signal is inputted to the polar coordinate correlator 21.

The polar coordinate correlator 21 changes the contents of the processing performed by the polar coordinate correlator 21 based on the gate signal. Specifically, when the inputted gate signal is "0" (when the target is not detected), the polar coordinate correlator 21 outputs the correlated data obtained by the calculation processing module 28 as the result of the scan correlation. Since the result of the scan correlation is outputted as conventionally when the target is not detected as described above, the radar image with suppressed unnecessary signal, such as clutter and noise, can be obtained.

On the other hand, when the inputted gate signal is "1" (the target is detected), the polar coordinate correlator 21 outputs the reception data inputted from the signal acquirer 20 as it is (the value without being scan-correlated) as the result of the scan correlation. Therefore, even with the target moving at high speed, the target is not suppressed by the scan correlation. As a result, even with regard to the target 30 moving at high speed, which is suppressed with the conventional scan correlation as illustrated in part (a) of FIG. 3, according to the configuration of this embodiment, as illustrated in part (b) of FIG. 3, the target 30 can be displayed clearly on the radar image. Thus, the discriminability of the target 30 can be improved.

As described above, the radar signal processing device 14 of this embodiment includes the signal acquirer 20, the previous data storage 29, the polar coordinate correlator 21, the trend curve calculating module 22, and the target detecting module 24. Further, a method of processing the radar signal by the radar signal processing device 14 of this embodiment is performed as follows.

Specifically, first, the signal acquirer 20 acquires the reception data in the polar coordinate system based on the reception signal. Next, the trend curve calculating module 22 calculates the distance-direction trend curve of the signal level of the reception data in the polar coordinate system. Subsequently, the target detecting module 24 detects the target based on the signal level of the reception data and the trend curve.

Before or after this, the polar coordinate correlator 21 acquires the previous correlated data stored in the previous data storage 29 in the polar coordinate system. Further, the polar coordinate correlator 21 performs the correlation between the reception data and the previous correlated data in the polar coordinate system to create the correlated data. Here, the polar coordinate correlator 21 changes the contents of the correlation of the reception data based on the target detection result from the target detecting module 24.

By changing the contents of the scan correlation based on whether the target is detected by the target detecting module 24 as described above, the suppression of the target due to the scan correlation can be prevented.

Next, a modification of the above embodiment is described.

In the above embodiment, the polar coordinate correlator 21 switches the processing between the case of outputting the correlated data and the case of outputting the reception data as it is (the value without being scan-correlated) based on the target detection result from the target detecting module 24. Instead of this, in this modification, the polar coordinate correlator 21 changes the filter coefficient α of the scan correlation based on the target detection result from the target detecting module 24.

This filter coefficient α is a parameter for adjusting the effect of the scan correlation, and the effect of the scan correlation becomes larger as the value of α becomes higher. Therefore, it becomes easier to suppress the target moving at high speed as the value of α becomes higher.

Thus, in the radar signal processing device 14 of this embodiment, when the gate signal outputted from the target detecting module 24 is "0" (the target is not detected), the polar coordinate correlator 21 increases the filter coefficient α. To the contrary, when the gate signal is "1" (the target is detected), the polar coordinate correlator 21 reduces the filter coefficient α.

According to this, when the target is detected by the target detecting module 24, since the effect of the scan correlation can be reduced, the suppression of the target becomes more difficult. Therefore, even the target relatively moving at high speed can be prevented from being suppressed by the scan correlation. On the other hand, when the target is not detected by the target detecting module 24, by sufficiently exerting the effect of the scan correlation, the radar image with suppressed clutter and noise can be obtained.

Next, another modification of the above embodiment is described.

Figure 5:
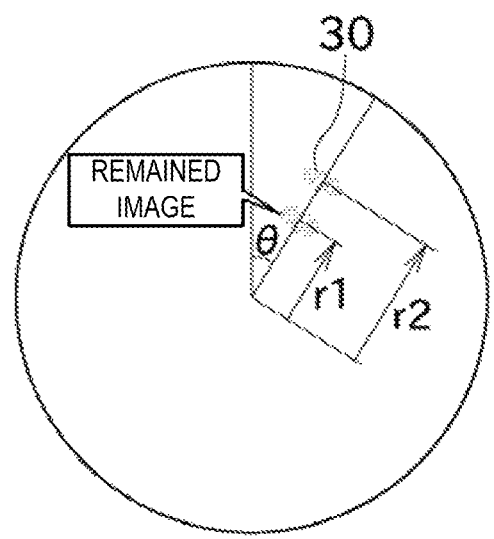
FIG. 5 is a schematic view illustrating a radar image with a remained image appeared by the conventional scan correlation.

As described above, the target relatively moving at high speed is detected at a position different from the immediately previous scan. Therefore, there is a case where the remained image appears at the position of the target in the immediately previous scan due to the scan correlation. For example, as illustrated in FIGS. 2(*a*) and 2(*b*), a case is considered where the target exists at the position at the distance r1 in the immediately previous scan, and the target moves to the position at the distance r2 in the latest scan. In this case, by taking the correlation between the data from the immediately previous scan and the latest reception data, as illustrated in FIG. 5, the remained image may appear at the position of the target in the immediately previous scan (the location at the distance r1).

Thus, in the modification described as follows, the contents of the processing performed by the polar coordinate correlator 21 is changed with reference to the gate signal from the immediately previous scan, so as to suppress the remained image.

Hereinafter, the modification is specifically described. The polar coordinate correlator 21 of this modification includes a detection result storage which can store the gate signals outputted from the target detecting module 24 (the target detection result) for one scan. Further, when at least one of the latest gate signal and the gate signal from the immediately previous scan stored in the detection result storage is "1" (the target is detected), the polar coordinate correlator 21 outputs the reception data as it is (the value without being scan-correlated) as the scan correlation result.

Specifically, the gate signal from the immediately previous scan being "1" indicates that the target at least existed in the immediately previous scan. Therefore, by performing the scan correlation in such a case, there is a possibility that the remained image appears at the target position in the immediately previous scan. Thus, even when the gate signal from the immediately previous scan is "1," the polar coordinate correlator 21 of this embodiment outputs the reception data as it is (the value without being scan-correlated) as the scan correlation result.

According to this, the appearance of the remained image at the position of the target in the immediately previous scan can be prevented. Therefore, a more suitable scan correlation result can be obtained.

Next, a second embodiment of the present invention is described. Note that, in the second embodiment, the configurations identical with as or similar to those in the first embodiment are denoted with the same reference numerals in the first embodiment and the description thereof is omitted.

Figure 6:
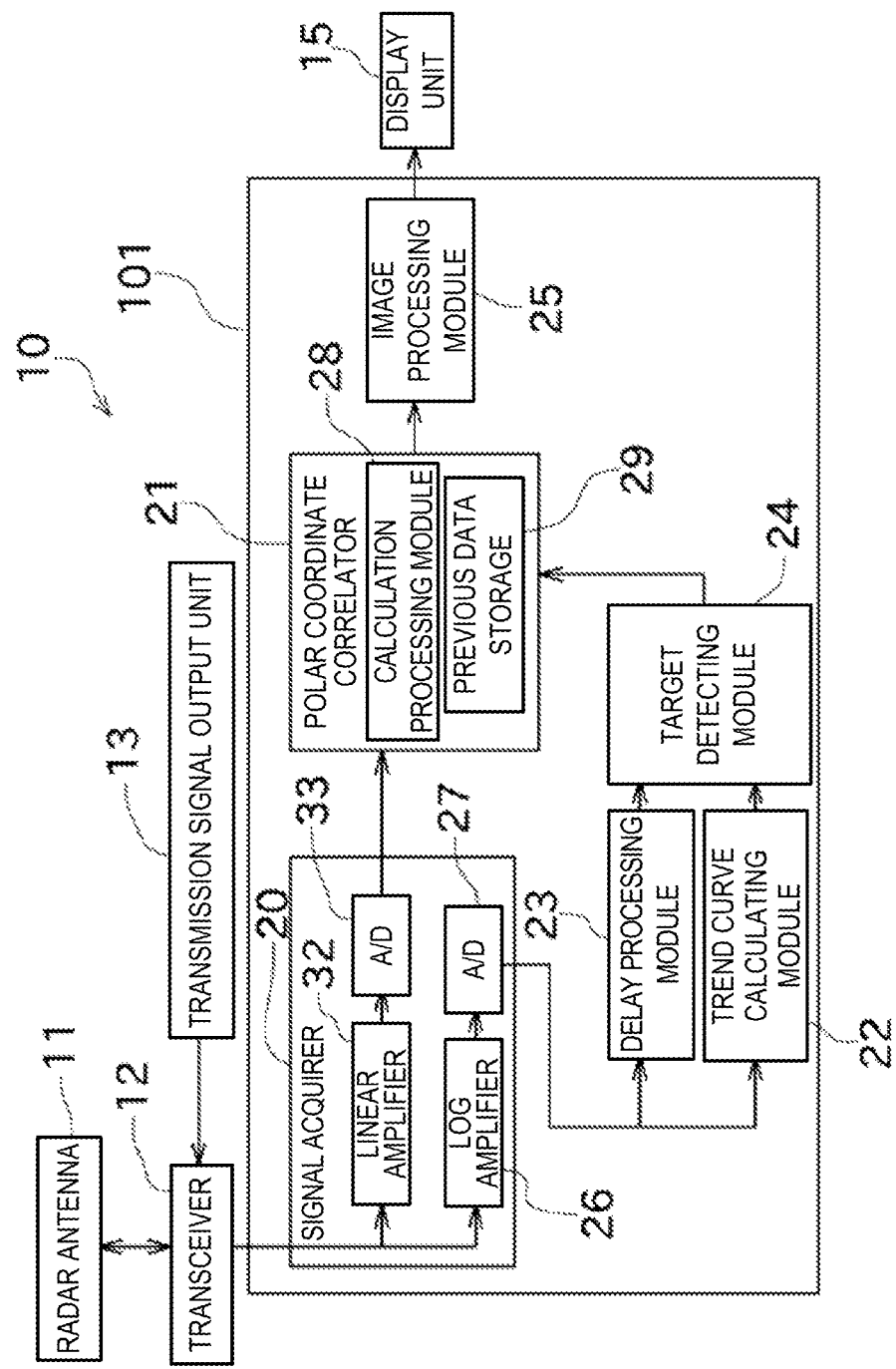
FIG. 6 is a block diagram of a radar apparatus according to a second embodiment.

As illustrated in FIG. 6, in a radar signal processing device 101 of this second embodiment, the signal acquirer 20 also includes a linear amplifier 32 in addition to the log amplifier 26. The reception signal received by the radar antenna 11 is amplified by the linear amplifier 32 and is sampled by an A/D converter 33.

The output of the log amplifier 26 (the reception data sampled by the A/D converter 27) is outputted to the target detecting module 24 and the trend curve calculating module 22 similarly to the first embodiment. Thus, the processing of detecting the target by using the output of the log amplifier which has the wide dynamic range and does not saturate easily can be performed, and therefore, the target can be detected accurately.

On the other hand, an output of the linear amplifier 32 (the reception data sampled by the A/D converter 33) is outputted to the polar coordinate correlator 21. The polar coordinate correlator 21 performs the scan correlation based on the output of the linear amplifier 32. By performing the scan correlation using the output of the linear amplifier 32 obtained by linearly amplifying the reception signal, the correlation between the previous signal level and the current signal level can be easily taken. As a result, a suitable scan correlation result can be obtained.

Although the preferred embodiment and the modifications of the present invention are described above, the above configurations may be modified as following examples.

The radar apparatus of the present invention is not limited to the radar apparatus for the ship, and may be applied broadly to radar apparatuses for other usages.

Following the polar coordinate correlator 21, other processing which can be performed in the polar coordinate system may be performed. For example, processing, such as a known ARPA (Automatic Radar Plotting Aid), can be incorporated for the correlated data in the polar coordinate system outputted from the polar coordinate correlator 21. To simply state, this is processing of automatically determining the chance of collision with the target. According to the configuration of the present invention, even if the target moves at high speed, it is not suppressed by the scan correlation; therefore, the chance of collision with the high-speed moving target can be determined accurately.

It is described that the target detecting module 24 outputs the gate signal according to the target detection result; however, the format that the target detecting module 24 outputs the target detection result is not limited to the gate signal, as long as the contents of the processing performed by the polar coordinate correlator 21 can be switched according to the target detection result from the target detecting module 24.

The amount of the offset added to the trend curve when detecting the target is preferred to be changeable by suitable operation by the operator. According to this, the offset can be adjusted according to a noise level or a clutter level and suitable processing can be performed. Moreover, a configuration may be adopted, in which the value of the offset is automatically adjusted according to the noise level or the clutter level.

The calculation method of the trend curve is not limited to a simple moving average, as long as a changing trend of the signal level of the reception data in the distance direction can be obtained.

What is claimed is:

1. A radar signal processing device, comprising:
   a signal acquirer configured to acquire reception data in a polar coordinate system based on a reception signal;
   a previous data storage configured to store previous correlated data in the polar coordinate system;
   a polar coordinate correlator configured to generate correlated data by performing, in the polar coordinate system, a correlation between the reception data and the previous correlated data stored in the previous data storage;
   a trend curve calculating module configured to calculate a trend curve of a distance-direction signal level of the reception data in the polar coordinate system; and
   a target detecting module configured to detect a target based on the signal level of the reception data and the trend curve,
   wherein the polar coordinate correlator changes the contents of the correlation of the reception data, based on the target detection result from the target detecting module.

2. The radar signal processing device of claim 1, wherein when the signal level of the reception data is higher than the trend curve by a predetermined level, the target detecting module detects the target, and
   wherein when the target detecting module detects the target, the polar coordinate correlator outputs a value of the reception data without being correlated.

3. The radar signal processing device of claim 1, wherein when the signal level of the reception data is higher than the trend curve by a predetermined level, the target detecting module detects the target, and
   wherein the polar coordinate correlator changes weight coefficients of the reception data and the previous correlated data for the case where the target is detected by the target detecting module and the case where the target is not detected.

4. The radar signal processing device of claim 1, wherein the target detecting module outputs a gate signal indicating whether the target is detected, and
   wherein the polar coordinate correlator changes the contents of the correlation according to the gate signal.

5. The radar signal processing device of claim 1, comprising a detection result storage configured to store at least the detection result from the target detecting module in a scan immediately previous to a current scan,
   wherein the polar coordinate correlator uses at least one of the detection result from the immediately previous scan stored in the detection result storage and the detection result from the current scan outputted from the target detecting module.

6. The radar signal processing device of claim 1, wherein the target detecting module detects the target when the signal level of the reception data is higher than a curve that is the trend curve with an offset added thereto.

7. The radar signal processing device of claim 1, wherein the signal acquirer has a log amplifier and a linear amplifier, and
   wherein the signal acquirer outputs an output of the log amplifier to the trend curve calculating module and the target detecting module and outputs an output of the linear amplifier to the polar coordinate correlator.

8. A radar apparatus, comprising:
   the radar signal processing device of claim 1;
   a radar antenna configured to receive the reception signal; and
   a display unit configured to display a radar image based on the result of the scan correlation performed by the polar coordinate correlator.

9. A method of processing a radar signal, comprising:
   acquiring reception data in a polar coordinate system based on a reception signal;
   acquiring previous correlated data in the polar coordinate system;
   generating correlated data by performing, in the polar coordinate system, a correlation between the reception data and the previous correlated data;
   calculating a trend curve of a distance-direction signal level of the reception data in the polar coordinate system; and
   detecting a target based on the signal level of the reception data and the trend curve,
   wherein in the generating the correlated data, the contents of the correlation of the reception data is changed based on the target detection result from the detecting the target.

10. The method of claim 9, further comprising detecting the target when the signal level of the reception data is higher than the trend curve by a predetermined level, and
    outputting a value of the reception data without being correlated.

11. The method of claim 9, further comprising detecting the target when the signal level of the reception data is higher than the trend curve by a predetermined level, and
    changing weight coefficients of the reception data and the previous correlated data for the case where the target is detected and the case where the target is not detected.

12. The method of claim 9, further comprising outputting a gate signal indicating whether the target is detected, and changing the contents of the correlation according to the gate signal.

13. The method of claim 9, further comprising storing at least the detection result from a scan immediately previous to a current scan, and further using at least one of the detection result from the immediately previous scan stored and the detection result from the current scan.

14. The method of claim 9, further comprising detecting the target when the signal level of the reception data is higher than a curve that is the trend curve with an offset added thereto.

15. The method of claim 9, further comprising outputting an output from a log amplifier for calculation of a trend curve and target detection, and outputting an output from a linear amplifier for scan correlation.

* * * * *